US006857884B2

(12) United States Patent
Kim et al.

(10) Patent No.: US 6,857,884 B2
(45) Date of Patent: Feb. 22, 2005

(54) COVER FOR JACK HOLE

(75) Inventors: Jae-Shik Kim, Seoul (KR); Jong-Cheon Wee, Suwon-shi (KR); Hwan-Seok Choi, Pyongtaek-shi (KR)

(73) Assignee: Samsung Electronics Co., Ltd. (KR)

( * ) Notice: Subject to any disclaimer, the term of this patent is extended or adjusted under 35 U.S.C. 154(b) by 26 days.

(21) Appl. No.: 10/328,195

(22) Filed: Dec. 23, 2002

(65) Prior Publication Data

US 2003/0117788 A1 Jun. 26, 2003

(30) Foreign Application Priority Data

Dec. 24, 2001 (KR) ........................................ 2001-83938

(51) Int. Cl.[7] .............................................. H01R 13/44
(52) U.S. Cl. ...................................................... 439/137
(58) Field of Search ................................ 439/138, 139, 439/137, 145; 174/67, 66

(56) References Cited

U.S. PATENT DOCUMENTS 771,410 A * 10/1904 Beerwald .................... 439/137

FOREIGN PATENT DOCUMENTS

EP        0922426     *  6/1999

* cited by examiner

Primary Examiner—Phuong Dinh
(74) Attorney, Agent, or Firm—Dilworth & Barrese LLP

(57) ABSTRACT

Disclosed is a cover for protecting a jack hole, into which a terminal of a microphone or a speaker in various electronic equipments, or a portable mobile telecommunication terminal device is inserted, and which is easily opened by an insertion force of a terminal into the jack hole. The jack hole cover includes a guide holder comprising a through hole for inserting the plug terminal and being fixed to the housing of the equipment, a slide cover comprising at least two pieces and being installed on the guide holder so that the pieces of the slide cover are outwardly stretched by an insertion force of the terminal, and elastic means for supporting the pieces of the slide cover prior to inserting the terminal into the through hole of the guide holder, thereby being automatically opened by inserting the terminal into the jack hole.

20 Claims, 4 Drawing Sheets

COVER FOR JACK HOLE

This application claims priority to an application entitled "TERMINAL COVER", filed in the Korean Industrial Property Office on Dec. 24, 2001 and assigned Ser. No. 2001-83938, the contents of which are hereby incorporated by reference.

BACKGROUND OF THE INVENTION

1. Field of the Invention

The present invention relates to a cover for protecting a jack hole, in which a terminal of a microphone or a speaker in various electronic equipment, including a portable mobile telecommunication terminal device, is inserted, and more particularly to a jack hole cover which is easily opened by an insertion force of a terminal into the jack hole without a separate covering means such as rubber.

2. Description of the Related Art

Typically, jack holes are installed on various electronic equipments, portable mobile telecommunication terminal devices, and so forth. For example, a portable mobile telecommunication terminal device comprises a jack hole for inserting a plug terminal of an ear-microphone, and a stereo comprises a jack hole for inserting a plug terminal of a microphone. Most electronic products use a plug terminal for electrically connecting a peripheral device to their main bodies. The plug terminal of the peripheral device is inserted into the jack hole of the main body of the electronic product.

However, most electronic products, such as a stereo, do not include a cover for closing the jack hole when the electronic products are not used. Therefore, foreign impurities may easily enter into the equipment via the opened jack hole, thereby causing malfunctioning of the equipment.

On the other hand, a portable mobile telecommunication terminal device often includes a cover for closing the jack hole. The cover is attached to or installed on a housing of the main body of the portable mobile telecommunication terminal device. The jack hole cover serves to prevent the portable mobile telecommunication terminal device from being contaminated by foreign impurities. The jack hole cover is detachably installed on the main body. In one recent example, one end of the jack hole cover is fixed to the main body and the other end of the jack hole cover comprises a removable plug wherein the jack hole is opened and closed, thereby providing for inserting a plug terminal into the jack hole. This detachable type of the jack hole cover prevents loss of the cover. This removable plug portion of the cover is made of rubber or silicon, thereby being easy to be opened by the manipulation of a user.

However, in order to insert a plug terminal into the jack hole, in the aforementioned cover structure, the cover must be first opened or removed from the jack hole prior to inserting the plug terminal into the jack hole. That is, a two-stage operation must be performed, thereby causing inconvenience to the user. Further, the jack hole cover made of rubber or silicon is easily worn out and damaged by repeated opening and closing motions. Moreover, in case of using rubber as the material of the jack hole cover, the cover is discolored by a long period use, thereby spoiling the appearance of the equipment.

SUMMARY OF THE INVENTION

Therefore, the present invention has been made in view of the above problems, and it is an object of the present invention to provide a jack hole cover which is automatically opened by inserting a plug terminal into the jack hole cover.

It is a further object of the present invention to provide a jack hole cover which can maintain its functionality for a long period of use.

It is another object of the present invention to provide a jack hole cover which is prevented from being contaminated by foreign impurities.

It is yet another object of the present invention to provide a jack hole cover which does not spoil the appearance of equipment provided with the jack hole cover.

In accordance with the present invention, the above and other objects are accomplished by the provision of a cover for closing a jack hole that receives a plug terminal in order to protect equipment provided with the jack hole from contamination by foreign impurities. The jack hole cover comprises a guide holder having a through hole for inserting the plug terminal and being fixed to the housing of the equipment, a slide cover comprising at least two pieces and being installed on the guide holder so that the pieces of the slide cover are outwardly stretched by an insertion force of the terminal, and an elastic retainer for supporting the pieces of the slide cover prior to inserting the plug terminal into the through hole of the guide holder.

Preferably, the guide holder may comprise leg guide grooves being formed between the through hole and the periphery of the guide holder and having the same number as the pieces of the slide cover. Guide grooves are connected to the corresponding leg guide groove. Each piece of the slide cover may comprise a body, a leg formed on the lower surface of the body and is guided by the leg guide groove of the guide holder. A cover piece is formed on the upper surface of the body to close the jack hole of the housing when the pieces of the slide cover are constricted and collected. A guide section is formed on the lower surface of the leg and has a cross sectional area greater than that of the leg, thereby allowing insertion into the guide groove of the guide holder.

Further, preferably, the guide groove of the guide holder may be inclined at a designated angle and the leg may be bent from the body at a designated angle, thereby guiding the guide section using the inclined surface of the guide groove of the guide holder. In this case, the upper surface of the cover piece of the slide cover is maintained parallel with the upper surface of the guide holder when the leg and the guide section of the slide cover moves along the inclined surface of the guide groove of the guide holder.

A terminal guide groove may be formed on the upper surface of the cover piece of the slide cover. The terminal guide groove is shaped such that when the pieces of the slide cover are constricted and collected, the terminal guide groove has a shape corresponding to the shape of the end of the inserted terminal. The terminal guide groove may be, for example, an inverted conical (concave) cavity formed on the center of the cover piece of the slide cover.

The elastic retainer may be an open-ring metal spring so that the spring is located on a spring fixing groove formed on the body of each piece of the slide cover. Alternatively, the elastic retainer may be a rubber O-ring located on a spring fixing groove formed on the body of each piece of the slide cover. However, the elastic retainer is not limited thereto. That is, the elastic retainer may be variously formed.

More preferably, the guide holder may be made in a disk shape. The cover pieces form a circle when the pieces of the slide cover are constricted and collected, thereby smoothly sliding the slide cover on the guide holder and minimizing a space generating on the housing of the equipment by the sliding of the slide cover. However, the shape of the jack hole cover of the present invention may be various. For example, the cover pieces of the slide cover may form an oval when the pieces of the slide cover are constricted and collected.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
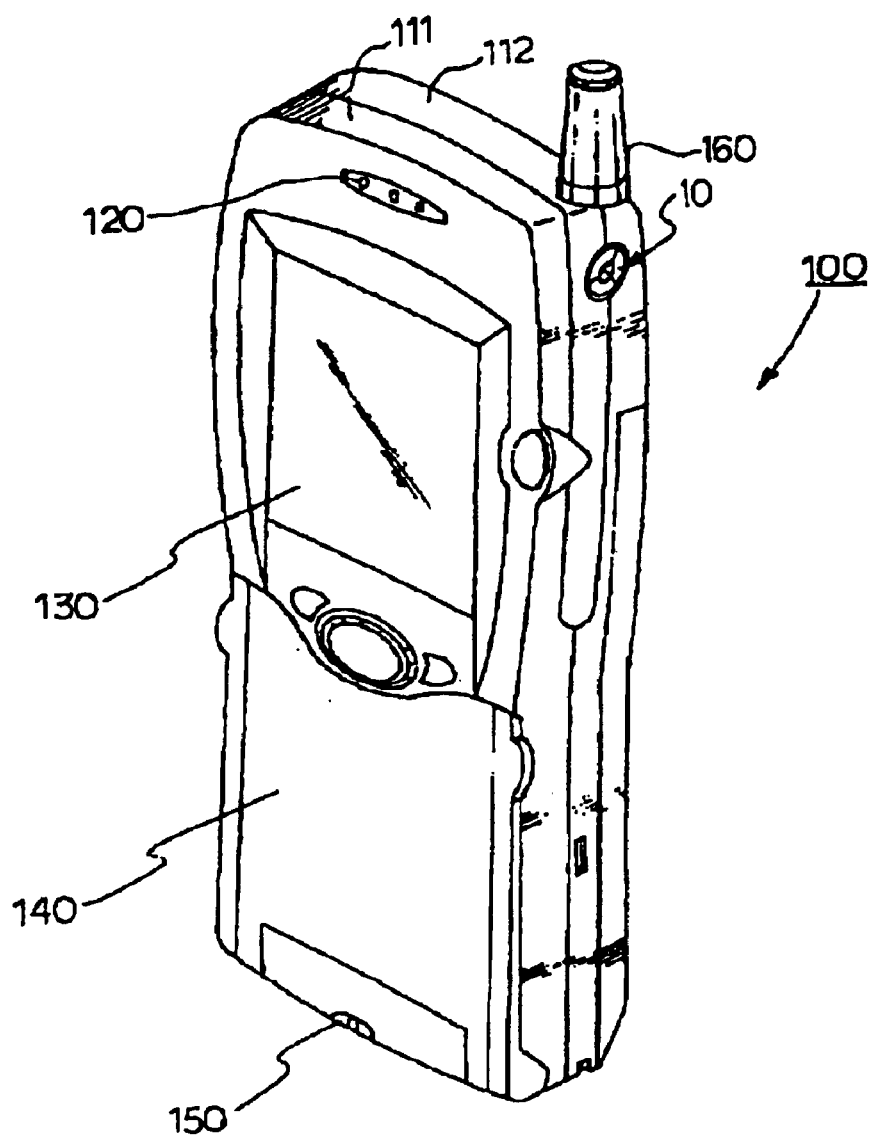
FIG. 1 is a perspective view of a portable mobile telecommunication terminal device provided with a jack hole cover in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a perspective view of a portable mobile telecommunication terminal device provided with a jack hole cover in accordance with a preferred embodiment of the present invention. The portable mobile telecommunication terminal device comprises a main body housing 100, an antenna 160, a speaker 120, a display panel 130, and a microphone 150. The housing 100 comprises an upper housing 111 and a lower housing 112. The antenna 160 is installed on the upper surface of the housing 100 and serves to transmit and receive signals. The speakerphone 120 is installed under the antenna 160. The display panel 130 is installed under the speaker 120 and serves to display input data. The microphone 150 is installed on the lower surface of the housing 100 and serves to transmit a voice to a counterpart. A keypad assembly (not shown) having a plurality of keys is formed on the lower surface of the display panel 130, by which a user can input desired data. A flip cover 140 for protecting the keypad assembly is separately attached to the housing 100 of the terminal device.

A jack hole cover 10 is installed on a side surface of the housing 100 of the terminal device. If necessary (for example, while driving), the user connects a terminal of an external microphone to a terminal connector (not shown) within the housing 100 via the opened jack hole cover 10.

Herein, the jack hole cover 10 is automatically opened by inserting an end of a terminal (50 in FIG. 7) into an inverted conical cavity (11 in FIG. 2) formed on the center of the jack hole cover 10 by a sufficient force.

Figure 2:
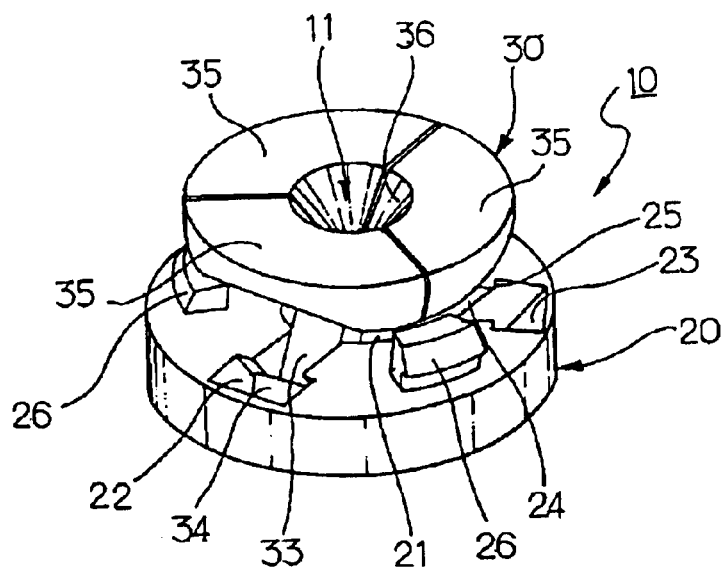
FIG. 2 is a perspective view of the jack hole cover in accordance with the preferred embodiment of the present invention.
Figure 3:
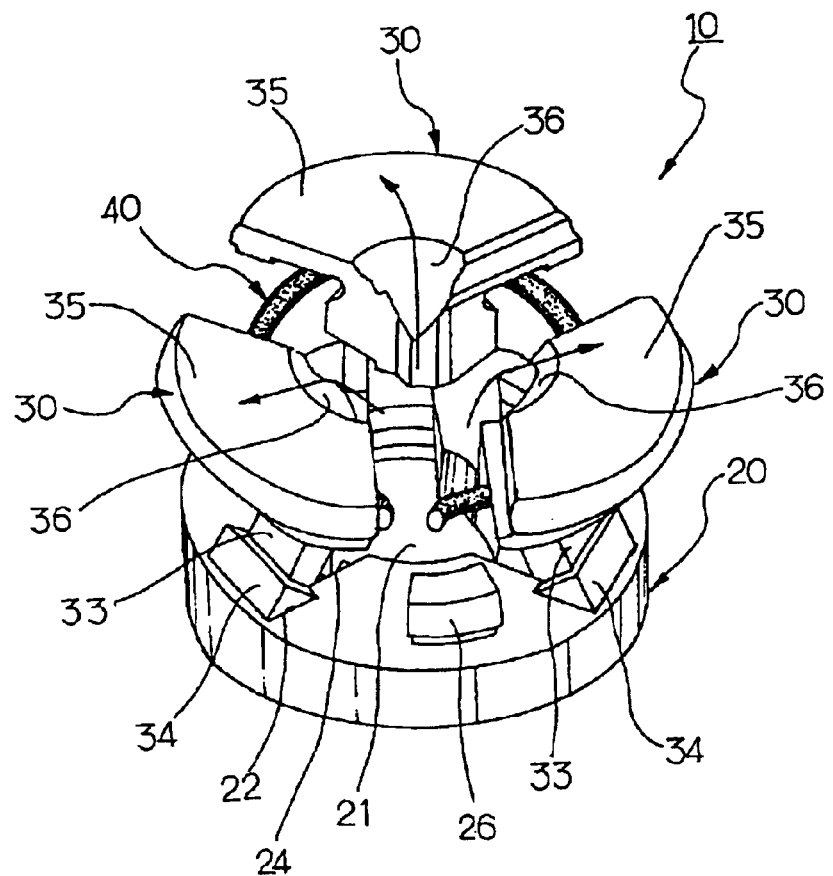
FIG. 3 is a perspective view of the jack hole cover, in a position in which a terminal may be inserted, in accordance with the preferred embodiment of the present invention.

FIG. 2 is a perspective view of the jack hole cover in accordance with the preferred embodiment of the present invention, and FIG. 3 is a perspective view of the jack hole cover, in which the terminal is inserted, in accordance with the preferred embodiment of the present invention.

With reference to FIGS. 2 and 3, the jack hole cover 10 comprises a guide holder 20, a slide cover 30 comprised of three pieces, and an elastic means 40. The guide holder 20 comprises a through hole 21 formed on the center for receiving the corresponding terminal, and is fixed to the housing 100 of equipments or products. The slide cover 30 comprises plural pieces and is installed on the guide holder 20 so that the pieces of the slide cover 30 move by an insertion force of the terminal. The elastic means 40 serves to gather the pieces of the slide cover 30 about the axis of hole 21 when the terminal is not inserted into the jack hole cover 10, thus closing the jack hole. In this preferred embodiment of the present invention, the slide cover 30 comprises three pieces, which slide on the guide holder 20. When three pieces are constricted and collected, the slide cover 30 forms a circle, and an inverted conical cavity 11 is formed on the center of the slide cover 30. Since the end of the terminal inserted into the jack hole cover 10 is generally shaped in the form of a cone, the inverted conical cavity 11 of the slide cover 30 corresponds to this conical shape of the end of the terminal, thereby smoothly inserting the terminal into the slide cover 30 through the inverted conical cavity 11. However, the shape of the cavity 11 formed on the center of the slide cover 30 is not limited thereto. That is, the shape of the cavity 11 may be variously formed so as to correspond to the shape of the end of the inserted terminal.

As the elastic retainer 40 for supporting the pieces of the slide cover 30 and for elastically constricting three pieces of the slide cover 30, an open-ring type spring is used. This preferred embodiment of the present invention uses the ring type spring 40, which is made of metal. However, if necessary, an O-ring made of rubber may be used as the elastic retainer 40.

FIG. 2 shows the slide cover 30, in which three pieces are elastically constricted, prior to inserting the terminal into the slide cover 30, and FIG. 3 shows the slide cover 30, in which three pieces are outwardly stretched as much as the diameter of the inserted terminal (not shown). Herein, the ring spring 40 used as the elastic retainer has a designated elastic force, thereby allowing the three pieces of the slide cover 30 to move radially outward. Therefore, the three pieces of the slide cover 30 move outwardly in the directions of arrows across cover piece 35, thereby maintaining the inserted state of the terminal in the jack hole cover 10.

Figure 4:
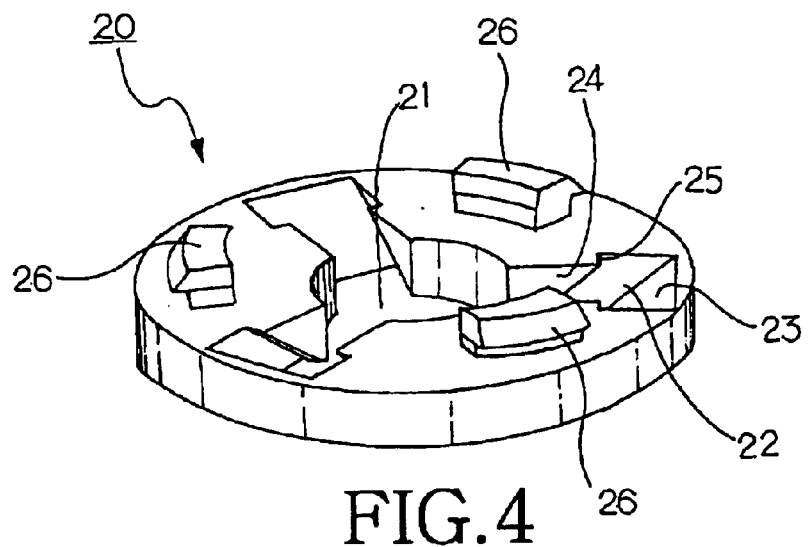
FIG. 4 is a perspective view of a guide holder of the jack hole cover in accordance with the preferred embodiment of the present invention.

FIG. 4 is a perspective view of the guide holder of the jack hole cover in accordance with the preferred embodiment of the present invention. The guide holder 20 of this preferred embodiment of the present invention is shaped as a disk. That is, the through hole 21 is formed on the center of the guide holder 20. The through hole 21 has a diameter greater than that of the inserted terminal. Further, the guide holder 20 comprises leg guide grooves 24 formed between the through hole 21 and the periphery of the guide holder 20, guide grooves 22 connected to the corresponding leg guide groove 24, surface 23 of the guide groove 22, and a locking means 26 to install the guide holder 20 on the inner surface of the lower housing 112. Herein, the leg guide groove 24 serves to guide each leg 33, and the guide groove 22 serves to guide a guide section 34 formed on the end of each leg 33. The leg 33 is formed on the body 31 of the slide cover 30, and is bent downward at a designated angle.

The guide section 34 is located within the guide groove 22, and is larger than leg guide groove 24 and thus is not moved into the leg guide groove 24. For example, as shown in FIG. 4, a stepped area 25 is formed on a contact between the leg guide groove 24 and the guide groove 22.

Therefore, the guide section 34 of the slide cover 30 has a cross sectional area greater than that of the leg 33, thereby being guided by the guide groove 22 of the guide holder 20.

Further, the surface 23 of the guide groove 22 of the guide holder 20, i.e., a surface of the guide groove 22 being in contact with the guide section 34, is inclined, thereby effectively guiding the guide section 34 of the leg 33, which is bent at a designated angle. Therefore, as shown in FIG. 2, when the terminal is inserted into the inverted conical cavity 11 of the slide cover 30, the inclined surface 23 of the guide groove 22 allows three pieces of the slide cover 30 to move radially outward with respect to the central axis of hole 21.

An upper surface of a cover piece 35 of the slide cover 30 is formed to lie parallel with the upper surface of the guide holder 20. Therefore, whether the pieces of the slide cover 30 are constricted or stretched, the upper surface of the cover piece 35 is always maintained parallel with the upper surface of the guide holder 20, thereby minimizing space on the housing 100 of the terminal device required to accommodate the sliding of the cover piece 35.

Figure 5:
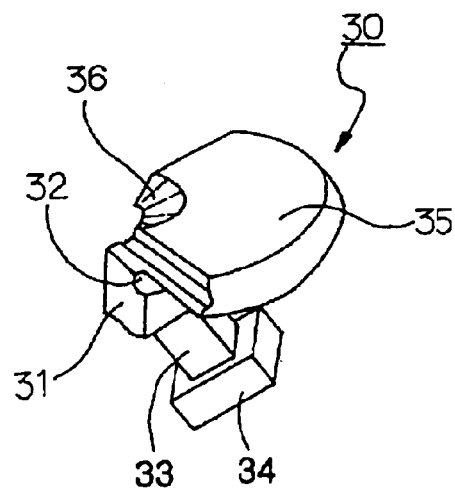
FIG. 5 is a perspective view of a piece of a slide cover of the jack hole cover in accordance with the preferred embodiment of the present invention.

FIG. 5 is a perspective view of the slide cover of the jack hole cover in accordance with the preferred embodiment of the present invention. As shown in FIG. 5, each piece of the slide cover 30 comprises the body 31, the leg 33, the cover piece 35, and the guide section 34. The leg 33 is formed on the lower surface of the body 31 and is guided by the leg guide groove 24 of the guide holder 20. When three pieces of the slide cover 30 are constricted and collected, the cover piece 35 formed on the upper surface of the body 31 serves to close the jack hole formed on the housing 100. The guide section 34 is formed on the lower surface of the leg 33 and has a cross sectional area greater than that of the leg 33, thereby being inserted into the guide groove 22 of the guide holder 20. The guide section 34 is shaped such that it may be snugly inserted into the guide groove 22 of the guide holder 20 and guided by the guide groove 22. Concurrently, the leg 33 has a designated bar or rod shape so as to be inserted into the leg guide groove 24 of the guide holder 20 and guided by the leg guide groove 24. Further, a spring fixing groove 32 is formed along the circumference of the body 31 formed on the lower surface of the cover piece 35, thereby providing a radially inward force on the pieces of the slide cover 30 using the ring-type spring 40.

As shown in FIG. 2, in order to form the inverted conical cavity 11 on the center of the slide cover 30, a terminal guide groove 36 is formed on the cover piece 35.

In case the slide cover 30 comprises three pieces, each cover piece 35 is shaped as one-third of a circle with an angle of 120 degrees. In case the slide cover 30 comprises two pieces, each cover piece 35 is shaped as a semicircle with an angle of 180 degrees. Further, in case the slide cover 30 comprises four pieces, each cover piece 35 is shaped as a quarter-circle with an angle of 90 degrees.

Figure 6:
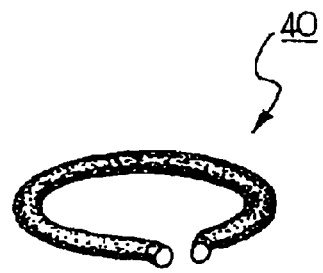
FIG. 6 is a perspective view of a ring spring of the jack hole cover in accordance with the preferred embodiment of the present invention.

FIG. 6 is a perspective view of the open-ring metal spring of the jack hole cover in accordance with the preferred embodiment of the present invention.

Figure 7:
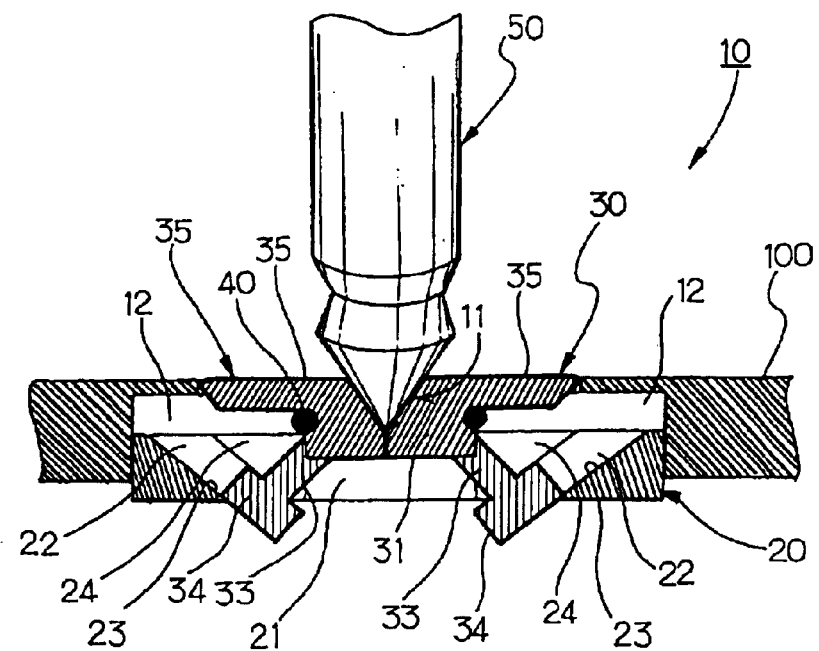
FIG. 7 is a partial cross-sectional view of the jack hole cover prior to inserting a terminal into the jack hole cover in accordance with the preferred embodiment of the present invention.
Figure 8:
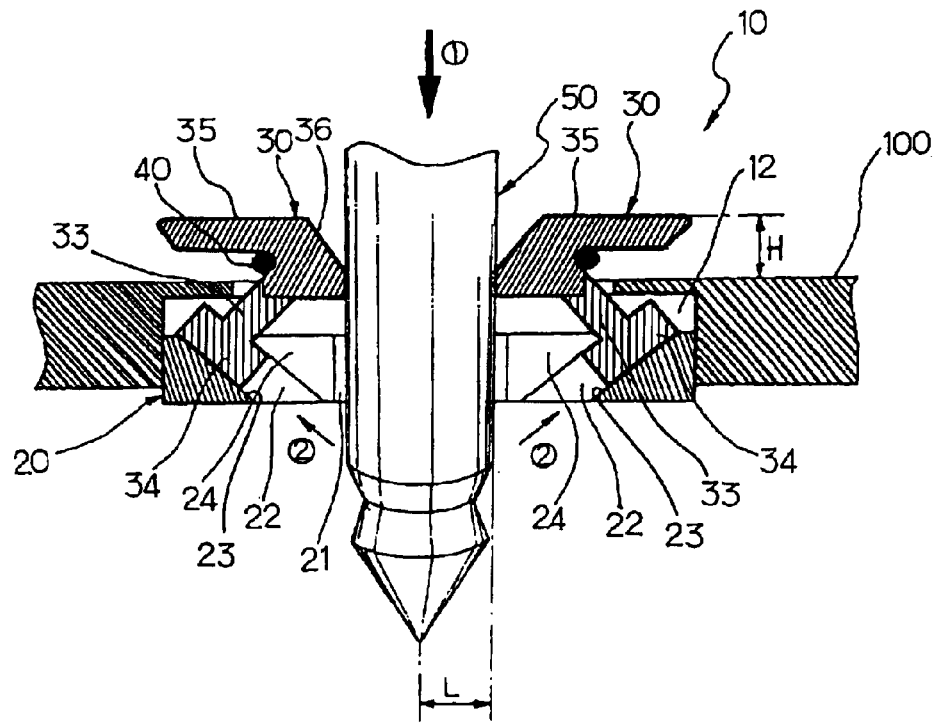
FIG. 8 is a partial cross-sectional view of the jack hole cover after inserting the terminal into the jack hole cover in accordance with the preferred embodiment of the present invention.

FIG. 7 is a partial cross-sectional view of the jack hole cover prior to inserting the terminal into the jack hole cover in accordance with the preferred embodiment of the present invention, and FIG. 8 is a partial cross-sectional view of the jack hole cover after inserting the terminal into the jack hole cover in accordance with the preferred embodiment of the present invention.

As shown in FIG. 7, an assembling of the jack hole cover 10 of the preferred embodiment of the present invention is described in detail. Each piece of the slide cover 30 is inserted into the corresponding guide groove 22 of the guide holder 20, thereby forming the slide cover 30. The pieces of the slide cover 30 are supported by the ring type spring 40 used as the elastic retainer. The guide holder 20 provided with the slide cover 30 is installed on the housing 100 of equipments or products. The guide holder 20 is installed on the inner surface of the housing 100 of the equipments or the products so as to face outward. A designated space 12 is formed between the guide holder 20 and the inner surface of the housing 100, thereby providing a space for the guide section 34 of the slide cover 30 to slide on the inclined plane 23 of the guide groove 22 of the guide holder 20 and preventing the guide section 34 of the slide cover 30 from being detached from the guide holder 20.

As shown in FIG. 8, when the terminal 50 is inserted into the jack hole cover 10 in the direction of the arrows ①, the slide cover 30 is moved to protrude above the guide holder 20. Herein, the end of the terminal 50 presses the inverted conical cavity 11 formed on the center of the slide cover 30. Then, the pieces of the slide cover 30 are moved against the force of retainer 40 in the upward and radially outward directions, as guided by guide groove 22.

Therefore, the end of the terminal 50 is entirely inserted into the jack hole cover 10, and the pieces of the slide cover 30 are outwardly stretched in the direction of the arrows ②. Herein, the guide section 34 of the slide cover 30 is guided by the guide groove 22 of the guide holder 20 and moves upward. At this time, as shown in FIG. 8, the pieces of the slide cover 30 move upward by a distance H and outward by a distance L (a radius of the terminal 50).

On the other hand, when the terminal 50 is entirely pulled out from the jack hole cover 10, the pieces of the slide cover 30 are returned to their original positions as shown in FIG. 7 by the ring spring 40 supporting the slide cover 30. Therefore, the user needs not manipulate the jack hole cover 10.

As apparent from the above description, according to the present invention, the jack hole cover is automatically opened by inserting the terminal into the jack hole cover of the equipments or the products, thereby being very convenient. Further, the jack hole cover of the present invention can be used for a long time, prevents contamination by foreign impurities, and does not spoil the appearance of an equipment provided with the jack hole cover.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cover for closing a jack hole for receiving an inserted plug terminal in order to protect an equipment provided with the jack hole installed on a housing from contamination by foreign impurities, said jack hole cover comprising:
   a guide holder comprising a through hole that receives the plug terminal and is fixed to the housing of the equipment;
   a slide cover comprising at least two pieces and being installed on the guide holder so that the pieces of the slide cover are moved radially outward with respect to the through hole by an insertion force of the terminal; and
   an elastic retainer including a ring spring that extends between and supports the pieces of the slide cover prior to inserting the terminal into the through hole of the guide holder.

2. The cover for closing the jack hole as set forth in claim 1, wherein said guide holder comprises:
   leg guide grooves being formed between the through hole and the periphery of the guide holder and having the same number as the pieces of the slide cover; and
   guide grooves connected to the corresponding leg guide groove,
wherein each piece of said slide cover comprises:
   a body;
   a leg formed on a lower surface of the body and guided by the leg guide groove of the guide holder;
   a cover piece formed on an upper surface of the body to close the jack hole of the housing when the pieces of the slide cover are constricted and collected radially inwardly by the elastic retainer; and
   a guide section formed on the lower surface of the leg and having a cross sectional area greater than that of the leg, thereby being guided by the guide groove of the guide holder.

3. The cover for closing the jack hole as set forth in claim 2, wherein said guide groove of the guide holder is inclined at a designated angle and a leg of the slide cover is bent from the body of the slide cover at the designated angle, wherein an inclined surface of the guide groove guides the guide section.

4. The cover for closing the jack hole as set forth in claim 2, wherein the upper surface of the cover piece of the slide cove is maintained parallel with the upper surface of the guide holder when the leg and the guide section of the slide cover moves along the inclined surface of the guide groove of the guide holder.

5. The cover for closing the jack hole as set forth in claim 2, wherein a terminal guide groove is formed on the upper surface of the cover piece of the slide cover when the pieces of the slide cover are constricted and collected radially inward by the elastic retainer, said terminal guide groove having a designated shape corresponding to the shape of the end of the inserted terminal.

6. The cover for closing the jack hole as set forth in claim 5, wherein the terminal guide groove is an inverted conical cavity formed on a center of the cover piece of the slide cover.

7. The cover for closing the jack hole as set forth in claim 1, wherein said ring spring is an open-ring metal spring and the ring spring is located on a spring fixing groove formed on the body of each piece of the slide cover.

8. The cover for closing the jack hole as set forth in claim 1, wherein said ring spring is a rubber ring located on a spring fixing groove formed on the body of each piece of the slide cover.

9. The cover for closing the jack hole as set forth in claim 1, wherein said slide cover comprises three pieces.

10. The cover for closing the jack hole as set forth in claim 1, wherein the cover pieces form a circle when the pieces of the slide cover are constricted and collected radially inward by the elastic retainer.

11. The cover for closing the jack hole as set forth in claim 3, wherein said guide holder is installed on an inner surface of the housing so as to face outward, and a designated space is formed between the guide holder and the inner surface of the housing, thereby providing a space for moving the guide section of the guide cover along the inclined surface of the guide groove of the guide holder and preventing the guide section of the guide cover from being detached from the guide holder.

12. A cover for closing a jack hole for receiving an inserted plug terminal in order to protect an equipment provided with the jack hole installed on a housing from contamination by foreign impurities, said jack hole cover comprising:
   a guide holder fixed to the housing of the equipment and comprising:
      a through hole for inserting the plug terminal;
      leg guide grooves being formed from the through hole toward the periphery of the guide holder and having the same number as the pieces of a slide cover; and
      guide grooves connected to e corresponding leg guide grooves; wherein the slide cover comprises at least two pieces and being installed on the guide holder so that the pieces of the slide cover are moved radially outward with respect to the through hole by an insertion force of the terminal, each piece of said slide cover comprising:
         a body;
         a leg formed on a lower surface of the body and guided by the leg guide groove of the guide holder;
         a cover piece formed on an upper surface of the body to close the jack hole of the housing when the pieces of the slid cover are constricted radially inward by the elastic retainer; and
         a guide section formed on the lower surface of the leg and having a cross sectional area greater than that of the leg, thereby being guided by the guide groove of the guide holder; and
   an elastic retainer that supports the pieces of the slide cover prior to inserting the terminal into the through hole of the guide holder.

13. The cover for closing the jack hole as set forth in claim 12, wherein said guide groove of the guide holder is incline at a designated angle and the leg of the slide cover is bent from the body of the slide cover at the designated angle, wherein an inclined surface of the guide groove guides the guide section.

14. The cover for closing the jack hole as set forth in claim 12, wherein the upper surface of the cover piece of the slide over is maintained parallel with the upper surface of the guide holder when the leg and the guide section of the slide cover moves along the inclined surface of the guide groove of the guide holder.

15. The cover for closing the jack hole as set forth in claim 12, wherein an inverted conical cavity is formed on a center of the cover piece of the slide cover when the pieces of the slide cover are constricted and collected radially inward by the elastic retainer, said terminal guide groove having a designated shape corresponding to the shape of the end of the inserted terminal.

16. The cover for closing the jack hole as set forth in claim 12, wherein said elastic retainer is an open-ring metal spring d the ring spring is located on a spring fixing groove formed on the body of each piece of the slide cover.

17. The cover for closi the jack hole as set forth in claim 12, wherein said elastic retainer is a rubber ring located on a spring fixing groove formed on the body of each piece of the slide cover.

18. The cover for closing the jack hole as set forth in claim 12, wherein said slide cover comprises three pieces.

19. The cover for closing the jack hole as set forth in claim 12, wherein the cover pieces form a circle when the pieces of the slide cover are constricted and collected radially inward by the elastic retainer.

20. The cover for closing the jack hole as set forth in claim 12, wherein the guide holder is installed on an inner surface of the housing so as to face outward, and a designated space is formed between the guide holder and the inner surface of the housing, thereby providing a space for moving the guide section of the guide cover along an inclined surface of the guide groove of the guide holder and preventing the guide section of the guide cover from being detached from the guide holder.

* * * * *